United States Patent [19]

Yoshikane et al.

[11] Patent Number: 4,596,009
[45] Date of Patent: Jun. 17, 1986

[54] INFORMATION SIGNAL REGENERATING STYLUS AND MANUFACTURING METHOD THEREOF

[75] Inventors: Tetsuo Yoshikane, Katano; Akira Kagata, Neyagawa; Hiromi Hiura, Katano, all of Japan

[73] Assignee: Matsushita Electric Industrial Co., Ltd., Osaka, Japan

[21] Appl. No.: 741,364

[22] Filed: Jun. 5, 1985

Related U.S. Application Data

[60] Division of Ser. No. 628,976, Jul. 10, 1984, Pat. No. 4,534,136, which is a continuation of Ser. No. 333,897, Dec. 23, 1981, abandoned.

[30] Foreign Application Priority Data

Dec. 29, 1980 [JP] Japan .................................. 55-188664
Oct. 27, 1981 [JP] Japan .................................. 56-172311

[51] Int. Cl.[4] .................................................. G11B 3/00
[52] U.S. Cl. .......................................................... 369/173
[58] Field of Search ......................... 51/281 R, 283, 326, 51/327, 125.5; 369/71, 173, 126, 127

[56] References Cited

U.S. PATENT DOCUMENTS 4,098,030 7/1978 Fuhrer et al. ..................... 51/281 R
4,104,832 8/1978 Keizer ............................... 51/281 R

FOREIGN PATENT DOCUMENTS

0062501 6/1978 Japan ................................... 369/173

Primary Examiner—Frederick R. Schmidt
Assistant Examiner—Robert A. Rose
Attorney, Agent, or Firm—Stevens, Davis, Miller & Mosher

[57] ABSTRACT

An information generating stylus to regenerate an information signal on a stylus base on which an electrode is applied as a variance of electrostatic capacity in conjunction with a running disc recording medium in which the information signal is recorded as a variance in a geometrical shape and a manufacturing method thereof, which comprises forming a prism with a part of the side on which said electrode is provided working as one side therefor on a tip of the conical or pyramidal stylus base with the electrode formed on one side; forming a sliding face with the disc recording medium on a tip of the prism.

1 Claim, 38 Drawing Figures

INFORMATION SIGNAL REGENERATING STYLUS AND MANUFACTURING METHOD THEREOF

This is a division of application Ser. No. 628,976 filed July 10, 1984, now U.S. Pat. No. 4,534,136, which in turn is a Rule 62 Continuation of Ser. No. 333,897 filed Dec. 23, 1981, now abandoned.

BACKGROUND OF THE INVENTION

The present invention relates to an information signal regenerating stylus with its base applied with an electrode and a manufacturing method thereof. The stylus detects an information signal as a variance of electrostatic capacity on a running disc recording medium (hereinafter called a "disc") in which said information signal is recorded as a variance in a geometrical shape.

As disclosed in Japanese Patent Laid-Open No. 140516/1979, the so-called electrostatic capacity system is considered at present for detection of an information signal as a variance of electrostatic capacity on a regenerating stylus with its base consisting of a diamond or the like applied with an electrode. This system includes a driver a disc in which the information signal is recorded in sequence as a variance in geometrical shape so as to have a spiral recording locus, without providing particularly a recording signal channel to guide the regenerating stylus on the surface of the disc. According to this system, resolution can be improved by minimizing the electrode applied on the regenerating stylus in thickness and width as compared with a bit size corresponding to the information signal, and a constitution of a regeneration system is simplified as compared with an optical system wherein the information signal recorded is the disc in read optically, thus providing various advantages as known well. Many types of information signal regenerating styli for use on said electrostatic capacity system have been proposed in the industry concerned. For example, one proposed information signal regenerating stylus has an electrode part attached on one side of a stylus base shaped as a triangular pyramid and then cut in at the tip to a constant width in the wear direction. This regenerating stylus has its length in the direction of sliding to the disc increased as it is worn out and is thus not capable of coping with a deflection of the disc, resulting in a sharp deterioration of the S/N ratio or a defect of dust sticking and stylus flying. Then, the length in the sliding direction of the regenerating stylus is limited according to the disc deflection, which is capable of marring the disc surface from a stylus pressure unit area exceeding allowable limit of an elasticity of the disc.

Another information signal regenerating stylus is formed by attaching the electrode part on one side of a stylus base in the shape of a pentagonal pyramid which is formed with a diamond or the like. This generating stylus needs a high precision on the tip and further requires that the stylus base be ground mechanically into the shape of a pentagonal pyramid, thus limiting mass production.

SUMMARY OF THE INVENTION

The present invention provides, in one phase, an information signal regenerating stylus which is superior in mass productivity and which not only minimizes a change in sliding area with the disc due to wear of the regenerating stylus but also curtails the amount of high precision mechanical grinding required at the time of manufacture.

The present invention then provides, in another phase, a stylus manufacturing method to improve working efficiency and also to lessen a change in the electrode width and the sliding area changing as working time passes.

DESCRIPTION OF THE PREFERRED EMBODIMENT

Figure 1:
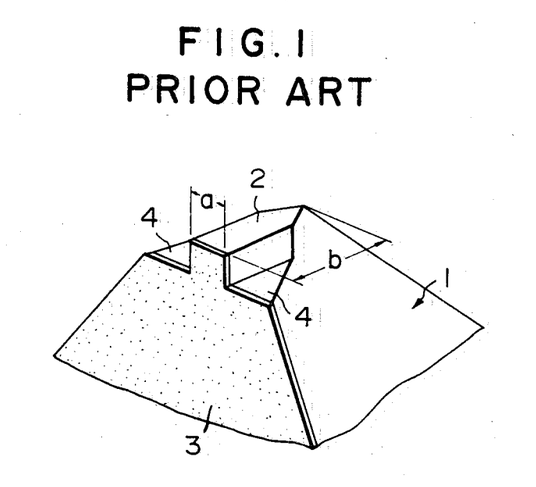
FIG. 1 is an essential part perspective view representing one example of a conventional regenerating stylus.
Figure 2:
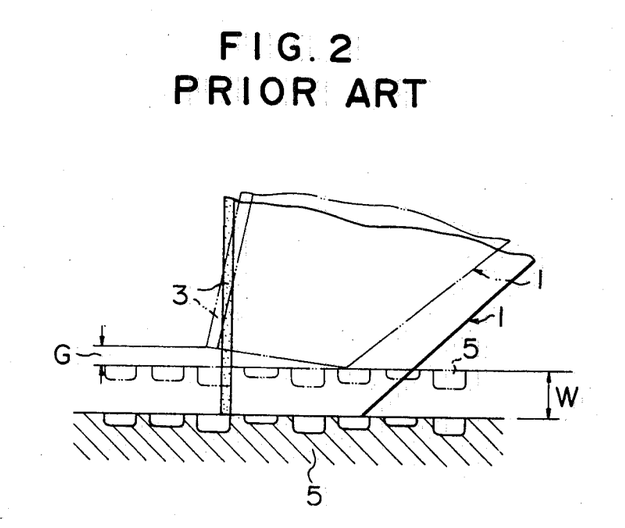
FIG. 2 is a diagram illustrating how said regenerating stylus operates.
Figure 3A:
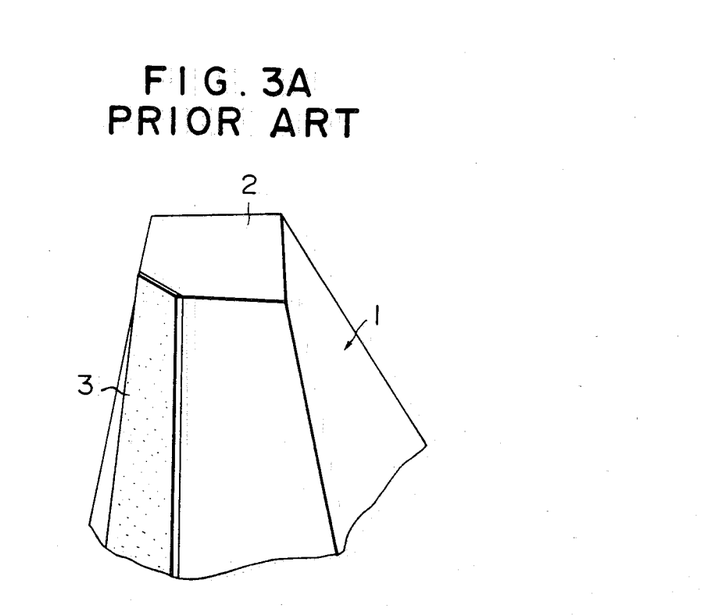
FIG. 3A is an essential part perspective view representing another example of the conventional regenerating stylus.
Figure 3B:
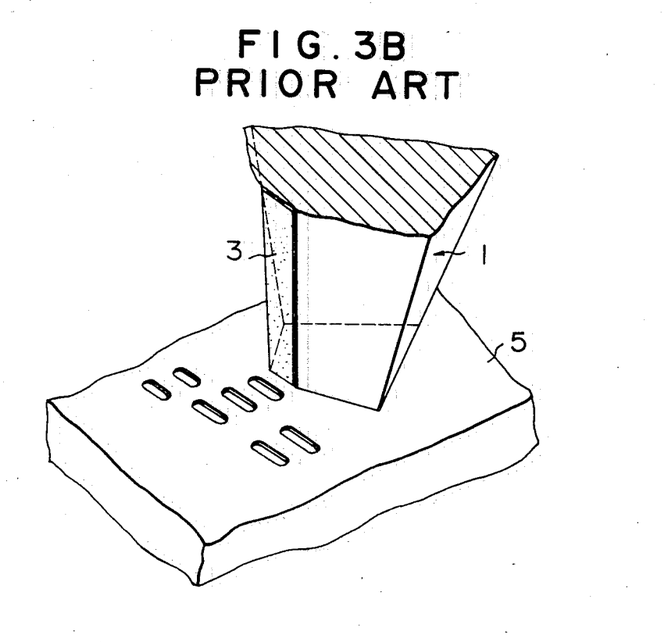
FIG. 3B is a perspective view illustrating how said regenerating stylus operates.

With reference to FIG. 1, there is illustrated a prior art regenerating stylus provided with an electrode part (3) on one side of a stylus base (1) ground to a triangular pyramid and also with a cut (4) at the tip so as to keep the electrode part (3) working as an information signal detecting part at a constant width (a) to the direction in which a wear of the regenerating stylus proceeds, and shaped so that the length in the sliding direction of a sliding face (2) with a disc will enlarge as a wear of the stylus proceeds. Now, the width (a) of the electrode part (3) is not changeable according to a change in the worn-out direction of the regenerating stylus, however, a change in the length (b) in the sliding direction is striking, and the stylus is not capable of coping with a deflection (W) of a disc (5) accordingly, thus resulting in a sharp deterioration of the S/N ratio or a defect of dust sticking and stylus flying, as shown in FIG. 2. Namely, where the disc (5) changes a position shown by the continuous line to a position shown by the two-dot chain line by (W) as indicated in FIG. 2, the regenerating stylus (stylus body (1)) also changes as shown in two-dot chain line, which can cause a gap (G) between the disc (5) and the electrode part (3). To obtain a stable picture, meantime, the electrode width (a) must be minimized to 1 $\mu$m or so, and the sliding direction length (b) must be taken so long as compared with the electrode width (a) for suitable stylus pressure onto the disc, however, the sliding direction length (b) is naturally limited by the disc deflection, and thus the stylus pressure per unit area exceeds an allowable limit for elasticity of the disc, which may deteriorate the disc surface severely. Then as shown in FIG. 3A, there is conceived such a stylus for which the stylus base (1) of non-conductive material which is superior in wear resistance like a diamond is formed to a pentagonal pyramid, and the electrode part (3) is provided on its one side. In the drawing, (2) indicates a sliding face, and (5) indicates a disc. FIG. 3B illustrates how it is used.

In the above constitution, the stylus base must be machined to a given pentagonal pyramid as a whole despite a high precision which is required on the tip, and a significant amount of grinding work is required, therefore mass production cannot be achieved.

Figure 4:
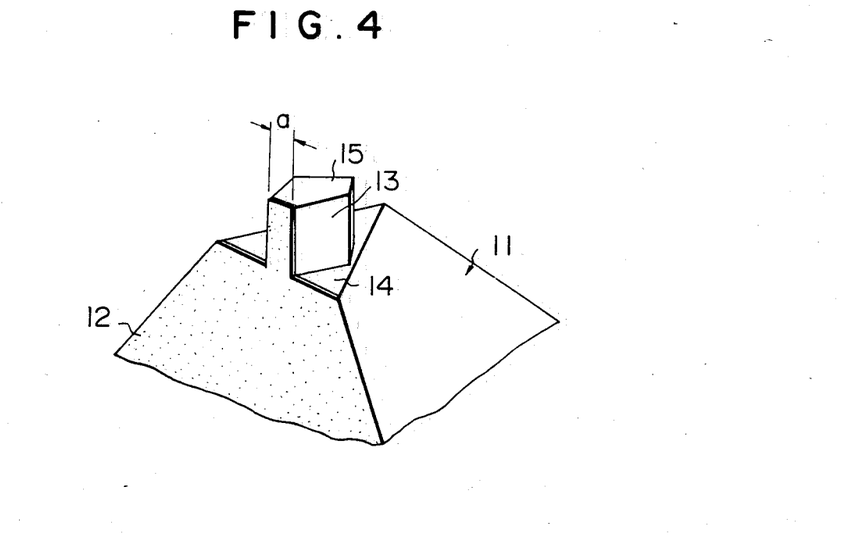
FIG. 4 is an essential part perspective view representing the first embodiment of the invention.

FIG. 4 represents one embodiment of the invention, wherein an electrode part (12) is provided on one side of a stylus base (11) ground to a triangular pyramid, and a pentagonal prism (13) for which a part of the side on which said electrode part (12) is provided becomes one side with a constant width (a) is formed on the tip. Namely, the pentagonal prism (13) is formed on the tip of the stylus base (11) in triangular pyramid to project for a face (14) which becomes almost parallel with the disc face at the time of regeneration. According to this constitution, an area of sliding face (15) with the disc will not increase as wear due to a regenerating operation proceeds, and the width (a) of the electrode part (12) will not change. Further, a working precision is not so required for grinding the stylus base (11) with a large working area to a triangular pyramid at the time of manufacture, therefore mechanical working is facilitated and the pentagonal prism (13) for which a high working precision is required on the tip is small in area to work, therefore the working time can be shortened.

Figure 5:
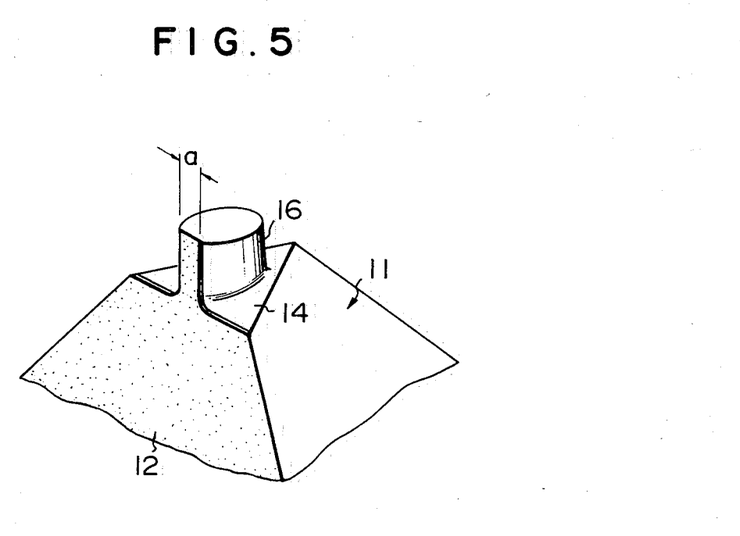
FIG. 5 is an essential part perspective view representing another embodiment of the invention.
Figure 6A:
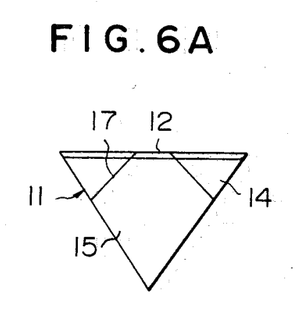
FIG. 6A to FIG. 6D are bottom views representing a further embodiment of the invention.
Figure 6B:
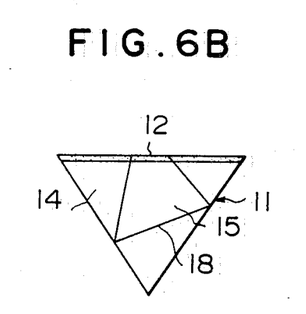
Figure 6C:
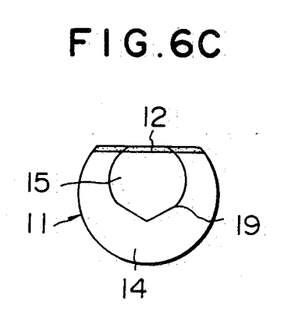
Figure 6D:
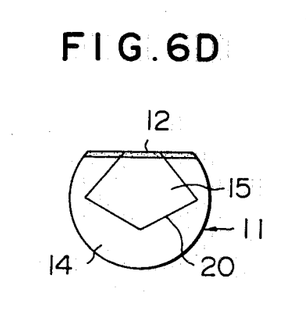

FIG. 5 represents another embodiment of the invention, wherein a prism (16) horseshoe in section for which a part of the side on which the electrode part (12) of the stylus base (11) in triangular pyramid is provided becomes one side is given instead of the pentagonal prism (13) in FIG. 4.

FIG. 6A, FIG. 6B, FIG. 6C and FIG. 6D represent further embodiments of the invention each, wherein 6A shows a pentagonal prism (17) symmetrical left and right which is provided on the tip of the stylus base (11) in a triangular pyramid; 6B shows a pentagonal prism (18) asymmetrical left and right which is provided on the tip of the stylus base (11) in a triangular pyramid; 6C shows a prism (19) horseshoe in section which is provided on the tip of the conical stylus base (11); 6D shows a pentagonal prism (20) is provided on the tip of a conical stylus base (11).

As described above, the present invention comprises providing a face opposite to the disc surface at the time of regeneration on the tip of the conical or pyramidal stylus base, providing the prism for which a part of one side whereat the electrode part of said stylus base is positioned becomes one side so that it projects from said face, working the tip of the prism as a sliding face with the disc, therefore the electrode width and the sliding face area will not increase in accordance as a wear proceeds at the time of regenerating operation, and a high precision grinding is not necessary for the stylus base with a large working area at the time of manufacture, the prism for which a high precision is necessary requires only a limited working area, thus facilitating the manufacture.

Next, an effective method for manufacturing the information signal regenerating stylus of the inventon will be taken up for description.

Figure 7:
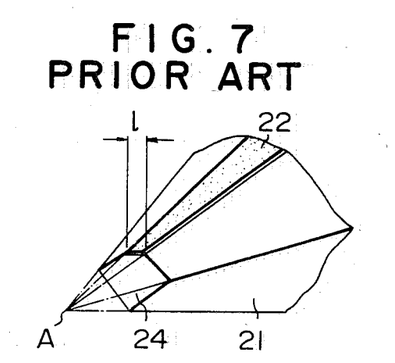
FIG. 7 is a perspective view showing a tip of the conventional regenerating stylus.

A conventional informatin regenerating stylus like that in FIG. 3 generally takes a method wherein a stylus base (21) is worked to a pentagonal pyramid as shown in FIG. 7, and then a disc sliding face (24) is formed. However, for formation of the pentagonal pyramid, four faces other than an electrode face (22) will have to be subjected to grinding separately each, and tips of the four faces must be concentrated almost at a point A which leads to an inferior working efficiency.

Figure 8:
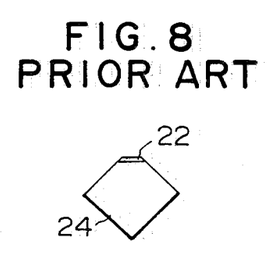
FIG. 8 is a plan view showing a sliding face of said regenerating stylus.
Figure 9A:
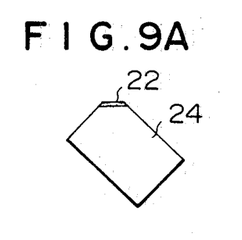
FIG. 9A and FIG. 9B are plan views showing a sliding face of a defectively-manufactured regenerating stylus.
Figure 9B:
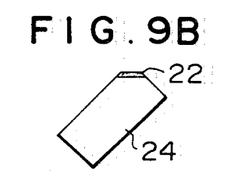

FIG. 8 indicates a shape of the sliding face given at the time of the four faces coming almost at the point A; FIG. 9A and FIG. 9B indicates an example of the sliding face shape in dispersion when each face does not come at one point.

The stylus base has a characteristic pentagonal pyramid in shape, and the electrode is tapered longitudinally of the stylus base, therefore a sliding face (24) and an electrode width (l) change due to wear as the working time passes, thus bringing a change to the $a^1$.

The stylus pressure per unit area is determined in consideration of flawing on the disc by the stylus or disc dusting characteristic, however, a change in the sliding face area may invite a change on the stylus pressure per unit area. Further, an optimal electrode width to a recording signal width is also specified accordingly, and thus it is desirable that a sharp change will not be brought thereon.

Figure 10:
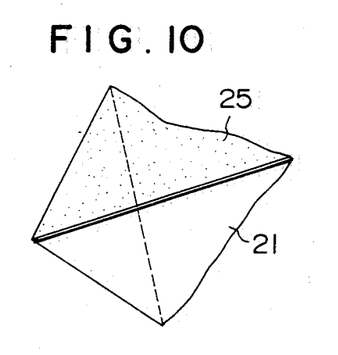
FIG. 10, FIG. 11 and FIG. 12 are perspective views of a stylus base used for a manufacturing method according to the invention.
Figure 11:
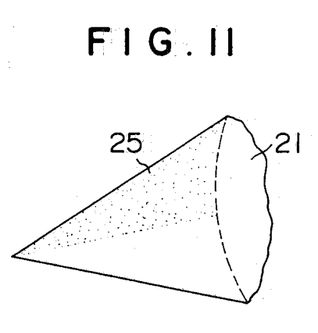
Figure 12:
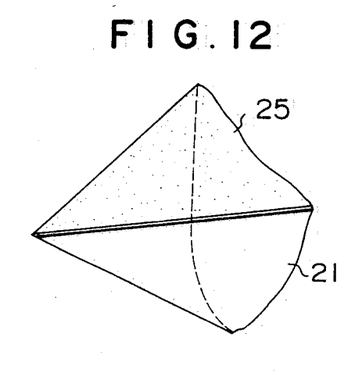
Figure 13:
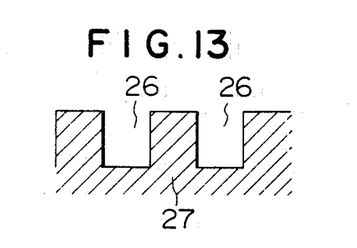
FIG. 13 is a side sectional view of a grinder used for the invention.
Figure 14:
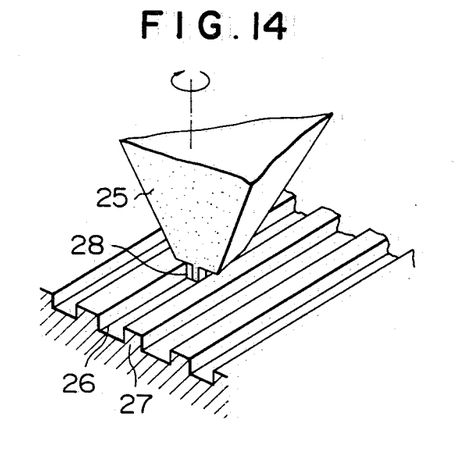
FIG. 14 is a perspective view illustrating a grinding state in the manufacturing method of the invention.
Figure 15:
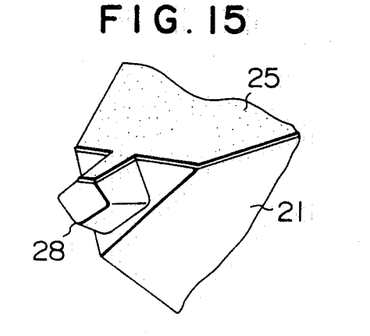
FIG. 15 is a perspective view showing a tip of one embodiment of the regenerating stylus manufactured according to the invention.

A manufacturing method for the regenerating stylus according to the invention will be described as follows:

A conical stylus base in a triangular pyramid, cone or a synthesized shape thereof which is relatively easy for working is used as a starting material as shown in FIG. 10, FIG. 11 and FIG. 12, and an electrode (25) is provided on one side thereof. Grinder (27) having a channel (26) with both sides almost in parallel and the bottom in flat concavity is then rotated as shown in FIG. 13, the conical stylus base (21) is rotated and stopped at a given range of angles to a shaft longitudinal thereof, and a tip (28) is pressed onto a channel (26) of said grinder (27) and detached therefrom repeatedly, thereby forming a prism or prismoid projection (28) having an electrode almost parallel longitudinally at the tip of the regenerating stylus as shown in FIG. 15.

Figures 16, 17:
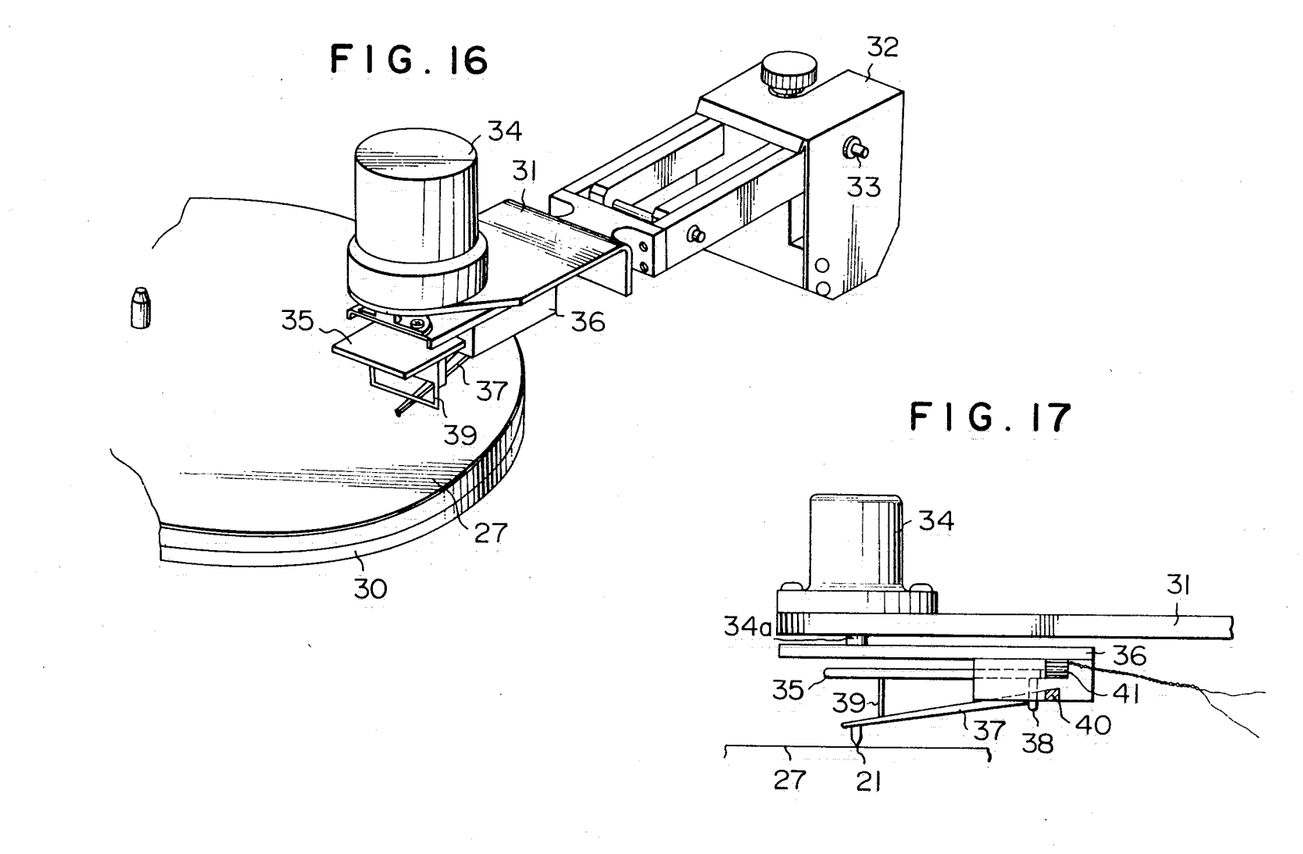
FIG. 16 is a perspective view representing one embodiment of a grinding device used for the invention.
FIG. 17 is an essential part side view thereof.

Next, the grinding method will be described in detail with reference to FIG. 16 to FIG. 20. In FIG. 16, (30) denotes a turntable mounted with said grinder (27) thereon and rotated at a constant speed, and (31) denotes an elevating lever supported on a fixed support (32) for ready turning around a shaft (33), and a motor (34) is fixed on the tip.

A motor shaft (34a) of the motor (34) penetrates said elevating lever (31), and a holder support (36) to support a grinding holder (35) detachably is fixed on its tip.

A cantilever (37) with the pyramidal stylus base (21) to grind fixed on the tip is fixed on said grinding holder (35) through an elastic body (38) like rubber which is given near its terminal, and a rubber ring (39) is provided between the neighborhood of a tip of the cantilever (37) and the grinding holder (35). Then, a magnet (40) is fixed at the terminal of the cantilever (37), and a constitution is such that the magnet (40) will be kept opposite to a solenoid (41) fixed on the support (36), as shown in FIG. 17, when the grinding holding (35) is installed on said support (36).

Namely, the cantilever (37) is turned around the elastic body (38) by controlling a current flowing to the solenoid (41), thereby adjusting a contact pressure between the stylus base (21) and the grinder (27) and isolating from the grinder (27).

Then, the stylus base (21) will come to position on an extension of the motor shaft (34a).

Figure 18:
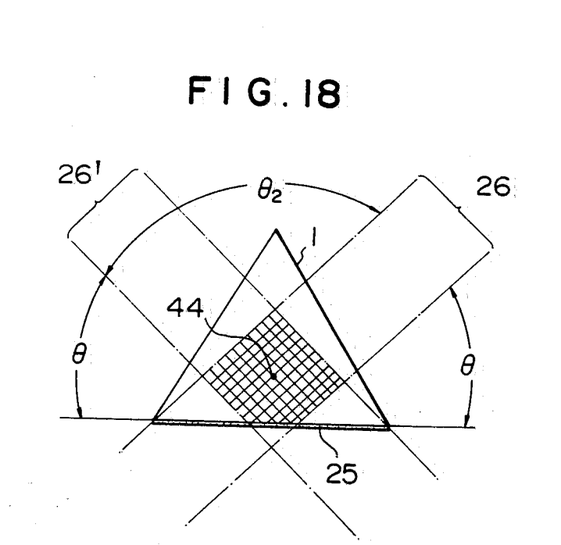
FIG. 18 and FIG. 19 are diagrams illustrating a grinding operation of an embodiment of the invention.

The stylus base (21) in triangular pyramid is now mounted on the cantilever (37) so as to have the electrode (25) almost at a right angle to the grinding face, and the motor (34) is rotated so that the face of the electrode (25) and the channel (26) of the grinder (27) will make a given angle θ as shown in FIG. 18, thereby determining a turning angle of the stylus base (21).

Then, a² a given current to the solenoid (41) to contact the stylus base (21) with the grinder (27), a portion positioned on the channel (26) of FIG. 18 is left as it is and the other portion is removed through grinding.

Next, the current is interrupted from flowing to the solenoid (41) to detach the stylus base (21) from the grinder (27), and the motor (34) is rotated by $\theta_2$ to turn the stylus base (21) by $\theta_2$ (=180°−2θ) around a shaft center (44) (positioned on an extension of the motor shaft (34a)) in FIG. 18, thereby keeping the stylus base (21) and the channel (26) in a positional relation indicated in a channel (26') of FIG. 18.

Figure 19:
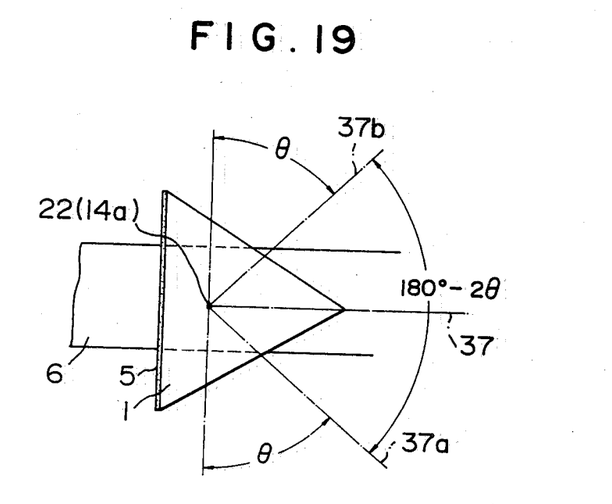

From the start of grinding and by moving the stylus base (21) downward thereafter, a portion positioned on the channel (26') of FIG. 18 is left as it is and the other portion is removed through grinding, thus forming a pentagonal prism indicated by the oblique line in FIG. 18. With reference to a rotational angle of the motor (34) in this case, where the cantilever (37) for which the electrode face (25) of the base (21) is paralleled with a width direction of the channel (26) as shown in FIG. 19 extends longitudinally of the channel (26), the cantilever is first turned as far as a position (37a) and then turned to a position (37b) for grinding. Practically it is preferable that it will be moved to positions (37a) and (37b) alternately a member of times for step-by-step grinding.

Figure 20A:
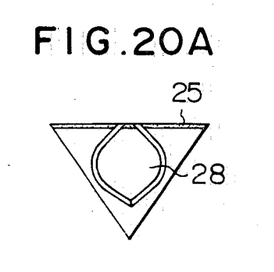
FIG. 20A to FIG. 20H are plan views of a tip of the regenerating stylus manufactured according to the invention.

Then, the projection (28) in the circular truncated cone can be formed like that of FIG. 20A by turning the cantilever (37) between the positions (37a) and (37b) with the base (21) pressed onto the channel (26).

Figure 20B:
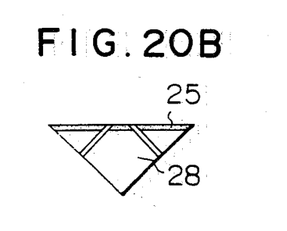
Figure 21:
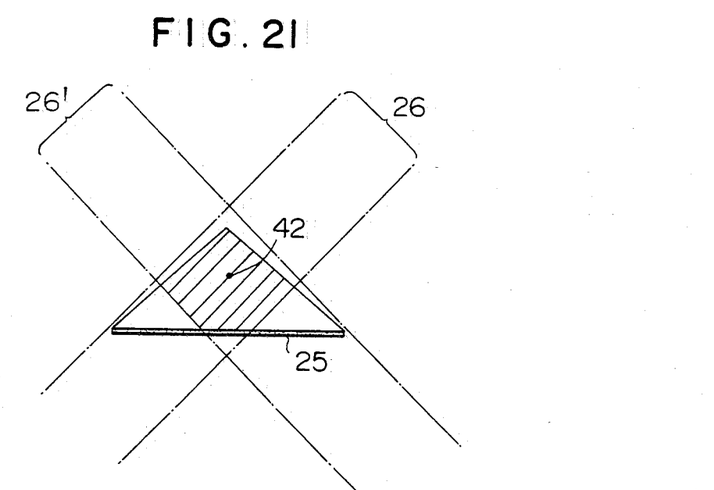
FIG. 21 is a diagram illustrating a grinding operation of another embodiment of the invention.

In a shape of the base (21) shown in FIG. 21, the projection (28) in pentagonal prism using two sides of the base in triangular pyramid straight as shown in FIG. 20B can be formed.

Figure 20C:
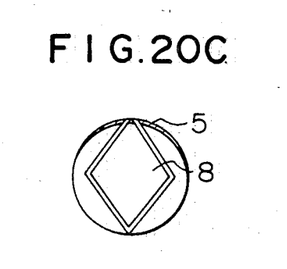
Figure 20D:
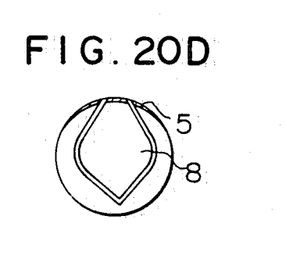
Figure 20E:
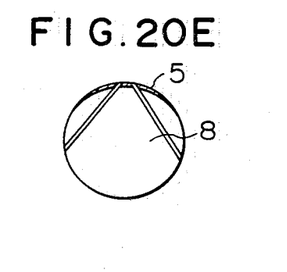
Figure 20F:
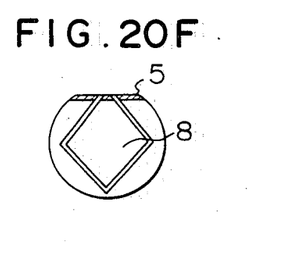
Figure 20G:
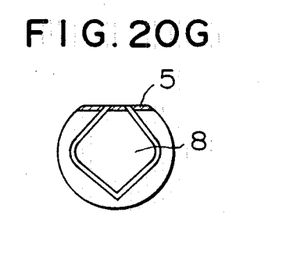
Figure 20H:
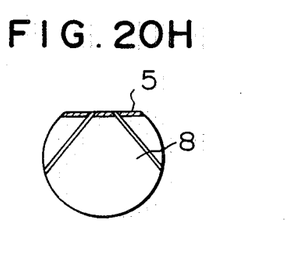

Furthermore, projections in the shape of FIG. 20C, FIG. 20D and FIG. 20E are obtainable through arranging a shape of the base (21) in a circular truncated cone, and projections (28) in the shape of FIG. 20F, FIG. 20G and FIG. 20H are obtainable similarly through arranging a shape of the base (21) in a circular truncated cone having the plane electrode (25) partly as shown in FIG. 12.

A grinding method wherein the electrode (25) extending longitudinally of the projection (28) can be unified in width will be described next.

Figure 22:
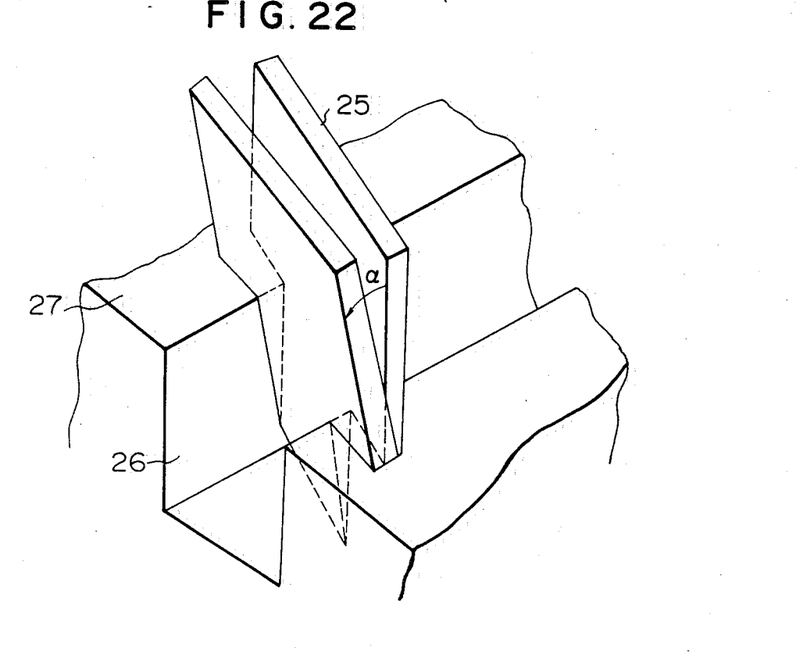
FIG. 22 is a perspective view illustrating a grinding operation in a further embodiment of the invention.

In the above description, the electrode (25) provided on the base (21) (not illustrated in FIG. 22) is ground as vertical to the grinder (27) and inclined in a width direction of the channel (26) as illustrated in FIG. 22.

Figure 23A:
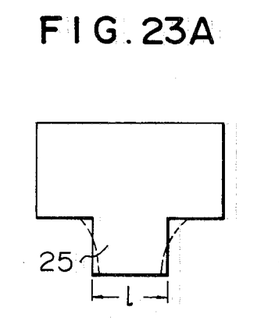
FIG. 23A and FIG. 23B are diagrams to illustrate a grinding operation of said embodiment.

The electrode (25) of a constant width 1 is obtainable ideally like that of FIG. 23A from the above way of grinding, however, such electrode as will get broad gradually upward may be obtainable actually as indicated by dotted line. To settle this problem, the electrode (25) will have to be inclined by an angle α in the grinding direction as shown in FIG. 22.

Figure 23B:
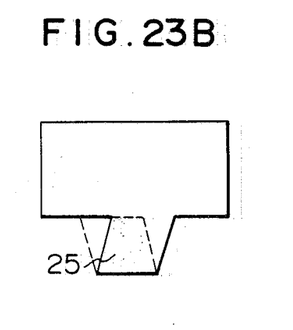

The electrode (25) is then obtainable in the shape of a parallelogram ideally as shown in FIG. 23B from the above way of grinding.

Next, a grinding indicated by dotted line of FIG. 23B is obtainable through grinding a different side by turning the cantilever (37) as described hereinabove, which may give a trapezoidal form indicated by oblique line in FIG. 23B ideally.

Figure 24:
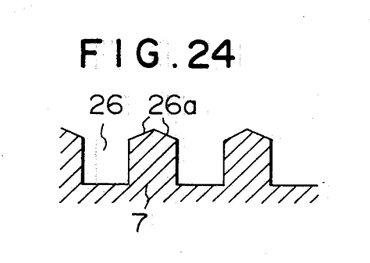
FIG. 24 is a side sectional view representing another embodiment of a grinding technique used for the invention.
Figure 25:
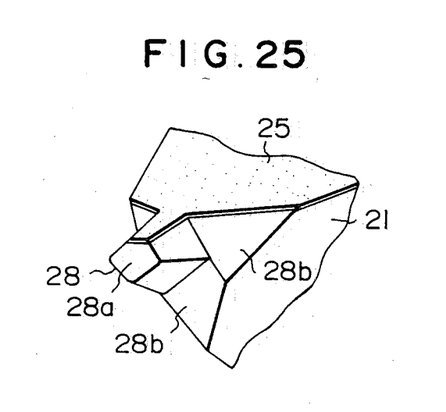
FIG. 25 is a perspective view showing a tip of the regenerating stylus ground on said grinder.

Therefore, a rectangular electrode as shown in FIG. 23A can be formed practically by adjusting the angle α in the above constitution. Then, a face (28b) which is not parallel with a sliding face (28a) with a recording medium of the prism projection (28) can be formed as shown in FIG. 25 by providing an inclination (26a) on the top of the channel (26) of the grinder (27) as shown in FIG. 24.

As described above, the present invention provides an available grinding method wherein only the tip of the stylus base formed in a truncated cone can be ground easily to the shape of a prism of a truncated cone.

What is claimed is:

1. An information signal regenerating stylus having a conical stylus base of non-conductive material and a tip projecting from said base, said tip comprising a face at the distal end of the tip adapted for contacting a recording disc and a surrounding lateral surface, a portion of said lateral surface being in common with a portion of the lateral surface of said base, said common surface portion having an electrode formed thereon, said electrode being defined by two parallel portions of the lateral surface of said tip in order to form a substantially constant width of said electrode in the region of the tip, all of the lateral surface portions of the tip being parallel to said electrode so that the tip is generally in the form of a cylinder, with the maximum width of the tip being greater than the width of the electrode portion of the tip.

* * * * *